(12) United States Patent
Jang

(10) Patent No.: US 7,705,941 B2
(45) Date of Patent: Apr. 27, 2010

(54) LIQUID CRYSTAL DISPLAY

(75) Inventor: Yang-Gyu Jang, Cheonan-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 620 days.

(21) Appl. No.: 11/610,238

(22) Filed: Dec. 13, 2006

(65) Prior Publication Data

US 2007/0200995 A1  Aug. 30, 2007

(30) Foreign Application Priority Data

Feb. 28, 2006  (KR) .................. 10-2006-0019288

(51) Int. Cl.
*G02F 1/1337* (2006.01)
*G02F 1/1339* (2006.01)

(52) U.S. Cl. .................... 349/129; 349/155

(58) Field of Classification Search ............ 349/129
See application file for complete search history.

(56) References Cited

U.S. PATENT DOCUMENTS

| | | | |
|---|---|---|---|
| 6,717,638 B1* | 4/2004 | Kim | 349/106 |
| 6,897,928 B2* | 5/2005 | Jang-kun | 349/129 |
| 2005/0078252 A1* | 4/2005 | Lin | 349/139 |
| 2005/0162598 A1* | 7/2005 | Choi et al. | 349/139 |

* cited by examiner

*Primary Examiner*—David Nelms
*Assistant Examiner*—W. Patty Chen
(74) *Attorney, Agent, or Firm*—H.C. Park & Associates, PLC

(57) ABSTRACT

A liquid crystal display includes a first substrate, a first field generating electrode arranged on the first substrate and including first and second cutouts, and a second substrate facing the first substrate. A second field generating electrode is arranged on the second substrate and includes a third cutout, and a liquid crystal layer is interposed between the first and second field generating electrodes. A column spacer is interposed between the first and second substrates and is disposed in the first cutout region.

19 Claims, 6 Drawing Sheets

LIQUID CRYSTAL DISPLAY

CROSS-REFERENCE TO RELATED APPLICATION

This application claims priority from and the benefit of Korean Patent Application No. 10-2006-0019288, filed on Feb. 28, 2006, which is hereby incorporated by reference for all purposes as if fully set forth herein.

BACKGROUND OF THE INVENTION

1. Field of Invention

The present invention relates to a liquid crystal display.

2. Discussion of the Background

A liquid crystal display (LCD) is one of the most widely distributed flat panel displays. Generally, the LCD includes two display panels having field generating electrodes, such as pixel electrodes and a common electrode, and a liquid crystal layer interposed therebetween. The LCD displays an image by applying a voltage to the field generating electrodes to generate an electric field in the liquid crystal layer, whereby an orientation of liquid crystal molecules in the liquid crystal layer controls the polarization of incident light.

A vertical alignment (VA) mode LCD has been widely used because it may have a high contrast ratio and may provide a wide viewing angle. Without an electric field, the major axes of liquid crystal molecules in the VA mode LCD may be arranged perpendicular to the display panels.

A number of methods may be used to provide a wide viewing angle in a VA mode LCD. For example, cutouts may be formed in the field generating electrodes, or protrusions may be formed on the field generating electrodes. Because the orientation to which the liquid crystal molecules are tilted may be determined using cutouts and protrusions, the reference viewing angle may be widened by changing the arrangements of the cutouts and protrusions, thereby providing various directions of the tilt orientation of the liquid crystal molecules.

However, for an LCD including cutouts, the liquid crystal molecules corresponding to the cutouts may not be suitably aligned, thereby causing texture. Furthermore, when a structure, such as a column spacer, is included in the LCD, distortion of an electric field may occur, thereby increasing the texture. The above information disclosed in this Background section is only for enhancement of understanding of the background of the invention and therefore it may contain information that does not form the prior art that is already known to a person of ordinary skill in the art.

SUMMARY OF THE INVENTION

The present invention provides an LCD that may be capable of reducing texture by decreasing the distortion of an electric field caused by a column spacer.

Additional features of the invention will be set forth in the description which follows, and in part will be apparent from the description, or may be learned by practice of the invention.

The present invention discloses a liquid crystal display including a first substrate, a first field generating electrode arranged on the first substrate and including first and second cutouts, and a second substrate facing the first substrate. A second field generating electrode is arranged on the second substrate, and it includes a third cutout. A liquid crystal layer is interposed between the first and second field generating electrodes. A column spacer is arranged between the first and second substrates in a region substantially corresponding to the first cutout.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention are incorporated in and constitute a part of this specification, illustrate embodiments of the invention, and together with the description serve to explain the principles of the invention.

DETAILED DESCRIPTION OF ILLUSTRATED EMBODIMENTS

Figure 1:
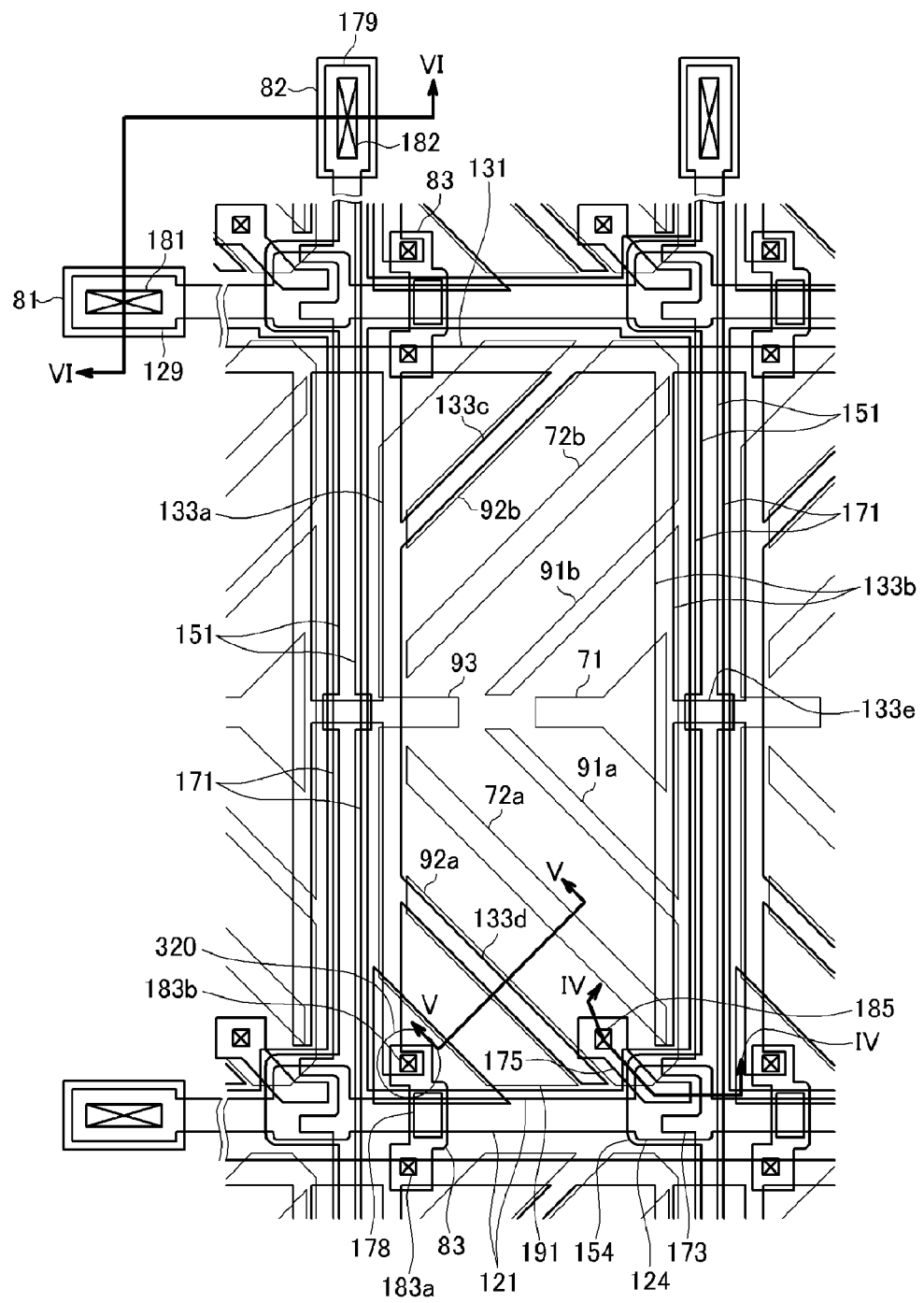
FIG. 1 is a layout view showing an LCD according to an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative size of layers and regions may be exaggerated for clarity. Like reference numerals in the drawings denote like elements.

It will be understood that when an element such as a layer, film, region, or substrate is referred to as being "on", "connected to", or "coupled to" another element or layer, it can be directly on, directly connected to, or directly coupled to the other element or layer, or intervening elements or layers may also be present. In contrast, when an element is referred to as being "directly on", "directly connected to", or "directly coupled to" another element or layer there are no intervening elements or layers present.

Hereinafter, exemplary embodiments of the present invention will be described in detail with reference to the attached drawings.

Figure 2:
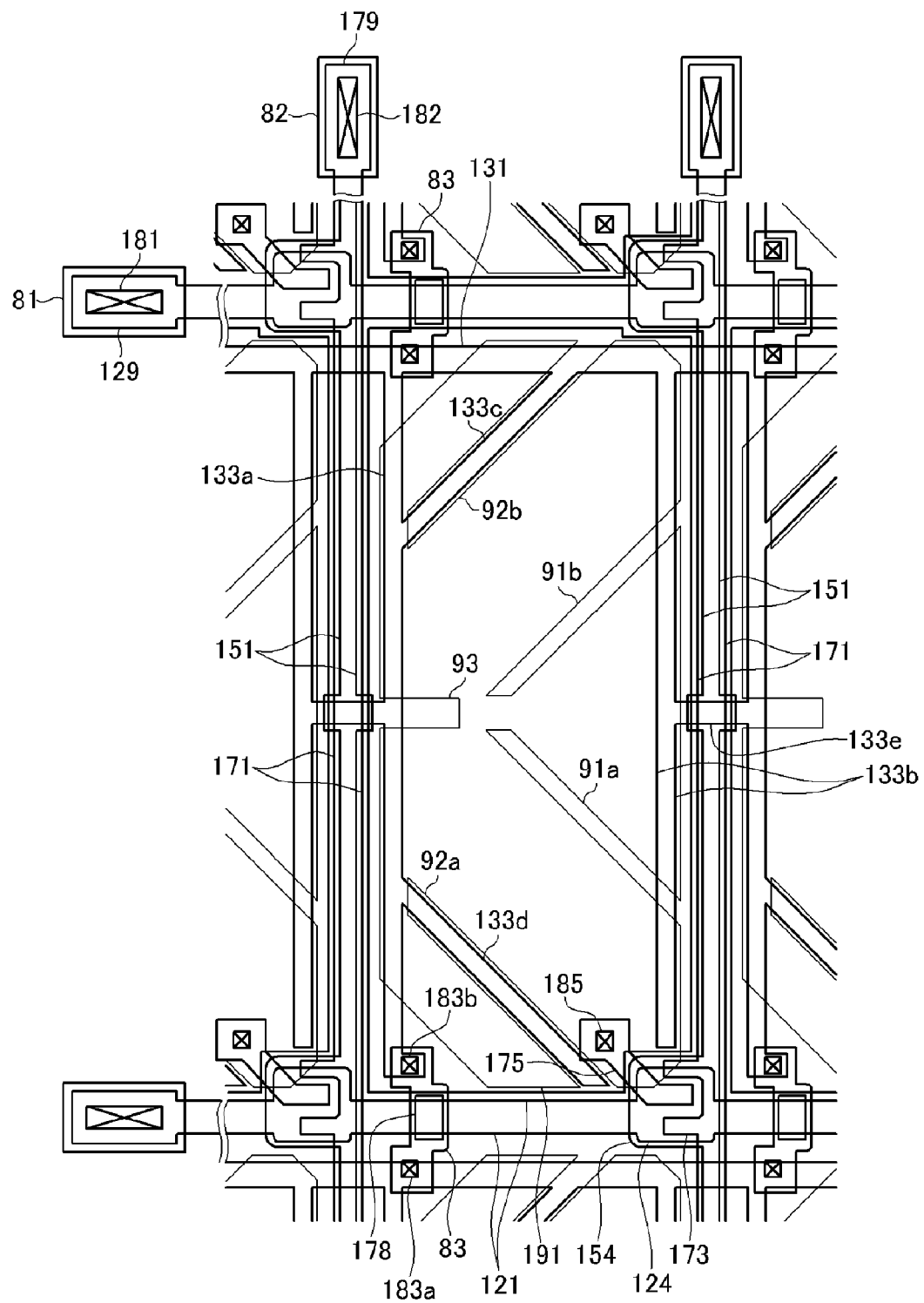
FIG. 2 is a layout view showing a thin film transistor array panel of the LCD of FIG. 1.
Figure 3:
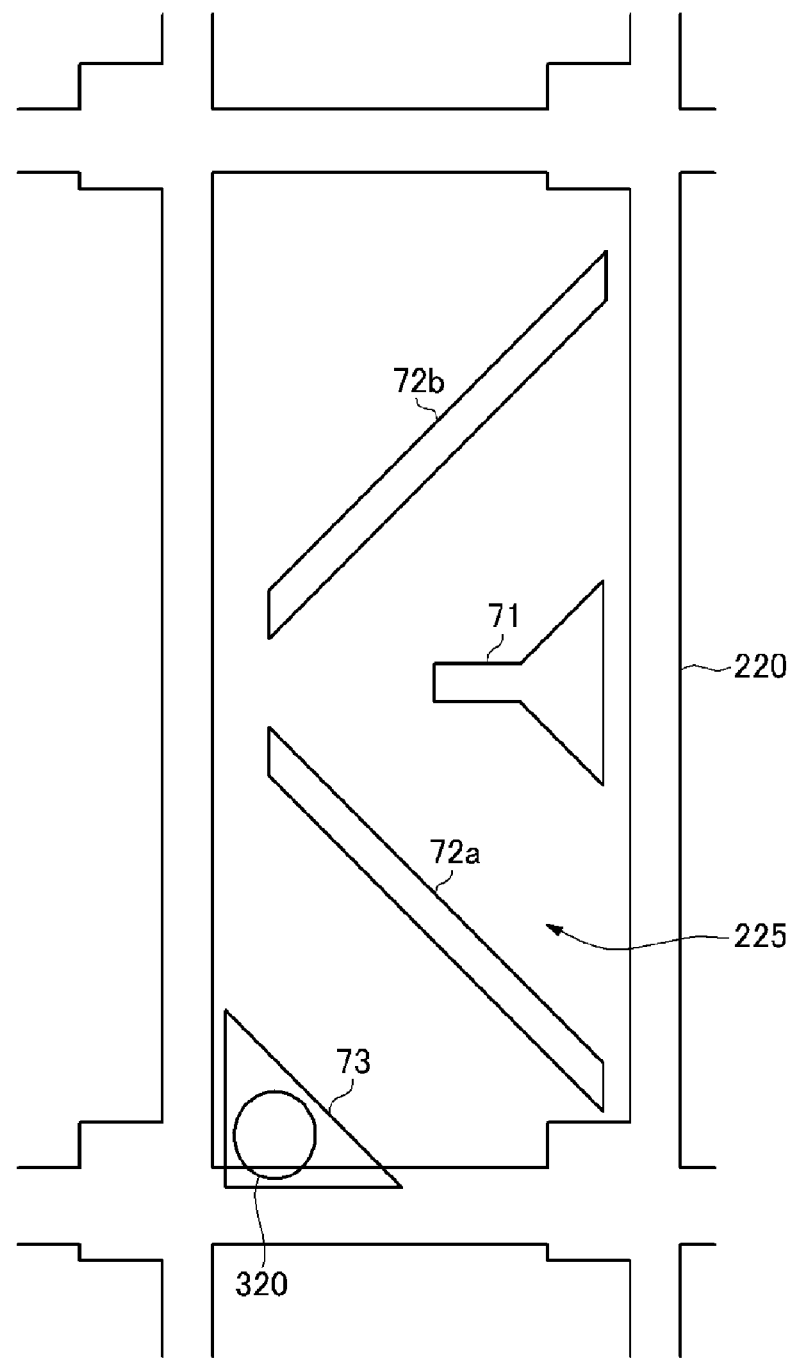
FIG. 3 is a layout view showing a common electrode panel of the LCD of FIG. 1.
Figure 4:
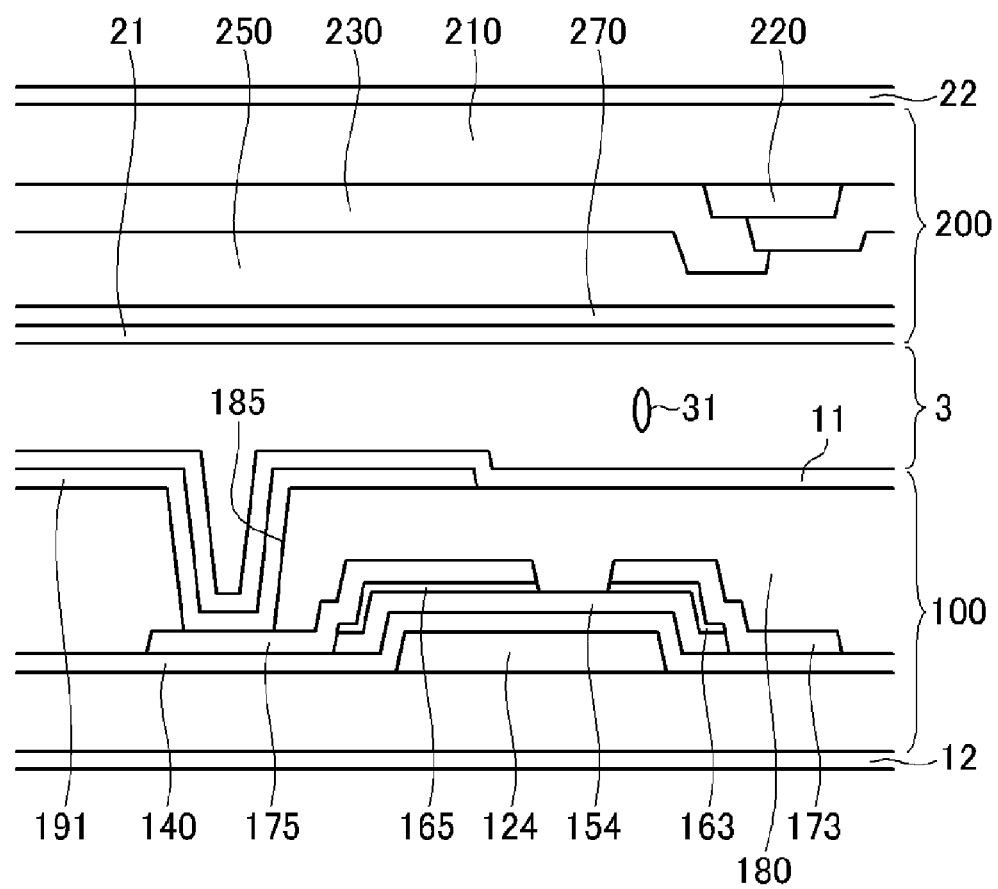
FIG. 4 is a cross-sectional view taken along line IV-IV of FIG. 1.
Figure 5:
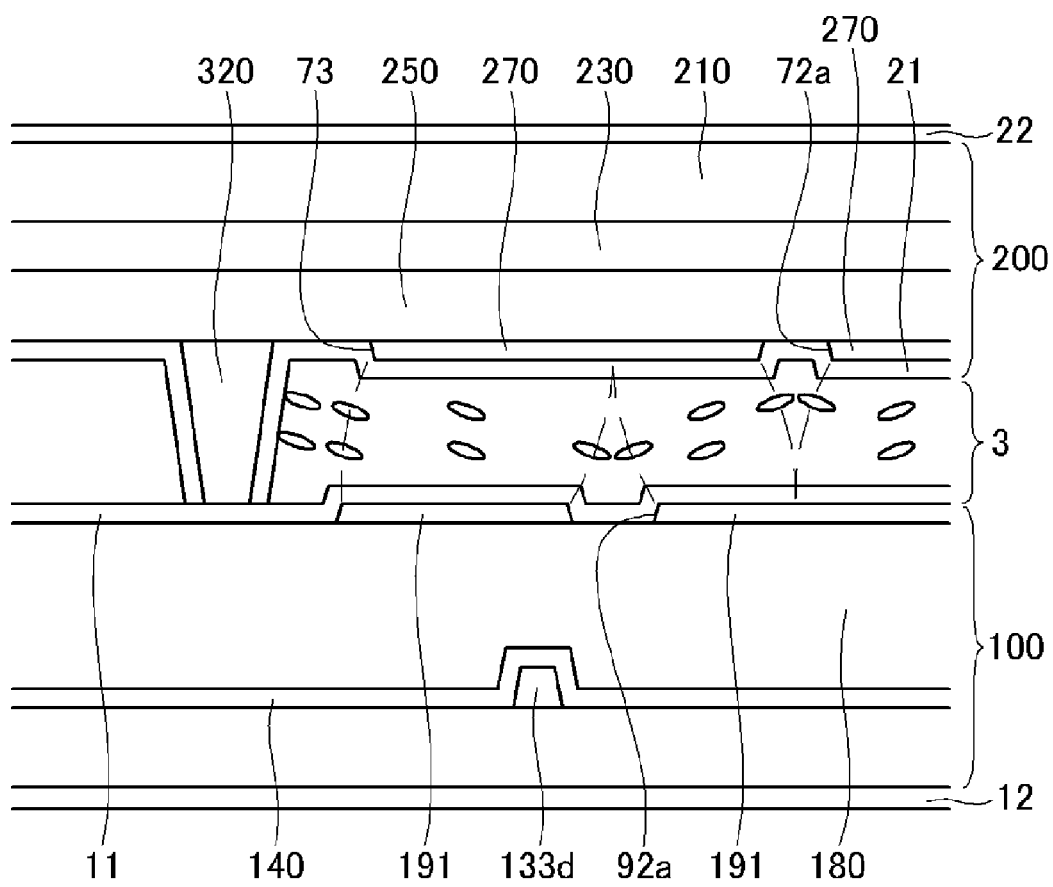
FIG. 5 is a cross-sectional view taken along line V-V of FIG. 1.
Figure 6:
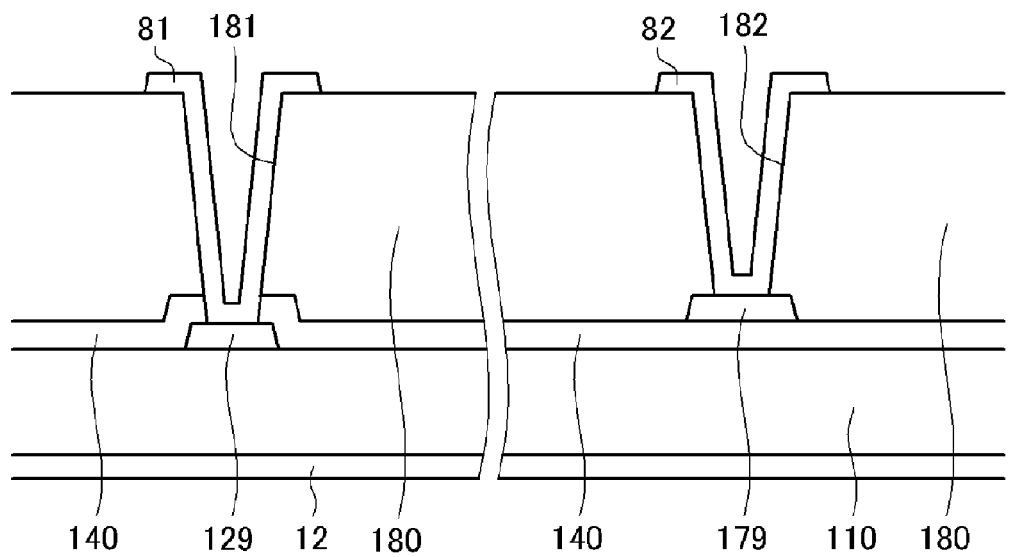
FIG. 6 is a cross-sectional view taken along line VI-VI of FIG. 1.

FIG. 1 is a layout view showing a liquid crystal display (LCD) according to an exemplary embodiment of the present invention, FIG. 2 is a layout view showing a thin film transistor array panel of the LCD of FIG. 1, and FIG. 3 is a layout view showing a common electrode panel of the LCD of FIG. 1. FIG. 4, FIG. 5, and FIG. 6 are cross-sectional views taken along lines IV-IV, V-V, and VI-VI of FIG. 1, respectively.

An LCD according to an exemplary embodiment of the present invention includes a thin film transistor array panel 100, a common electrode panel 200 facing the thin film transistor array panel 100, and a liquid crystal layer 3 interposed between panels 100 and 200.

First, the thin film transistor array panel 100 will be described in detail with reference to FIG. 1, FIG. 2, FIG. 4, FIG. 5, and FIG. 6.

A plurality of gate lines 121 and a plurality of storage electrode lines 131 are arranged on an insulating substrate 110.

The gate lines 121 transmit gate signals, and they extend horizontally. Further, each gate line 121 includes a plurality of upward and downward protruding gate electrodes 124 and a large-area end portion 129 for connecting to other layers or external driving circuits. A gate driving circuit (not shown), which generates the gate signals, may be mounted on a flexible printed circuit film (not shown) attached on the substrate 110, directly mounted on the substrate 110, or integrated on the substrate 110. When the gate driving circuit is integrated on the substrate 110, the gate lines 121 may extend to be directly connected to the gate driving circuit.

The storage electrode lines 131 may be supplied with a predetermined voltage. Further, each storage electrode line 131 includes stem lines extending substantially parallel with the gate lines 121, a plurality of storage electrode sets 133a, 133b, 133c, and 133d branching from the stem lines, and connections 133e. Each storage electrode line 131 is disposed between two adjacent gate lines 121, and the stem line thereof may be closer to the upper of the two adjacent gate lines 121.

Each storage electrode set includes first and second storage electrodes 133a and 133b, which extend vertically and are spaced apart from each other, and third and fourth storage electrodes 133c and 133d, which extend obliquely.

The first and second storage electrodes 133a and 133b each include a fixed end connected to the corresponding storage electrode line 131 and a free end located opposite to the fixed end. The free end of each first storage electrode 133a has a protruded portion.

The third storage electrode 133c extends obliquely from a central portion of the storage electrode line 131 to the first storage electrode 133a, and the fourth storage electrode 133d is connected to the first storage electrode 133a and extends obliquely toward the free end of the second storage electrode 133b.

The third and fourth storage electrodes 133c and 133d form inversion symmetry about the center line between the two neighboring gate lines 121. The connections 133e connect the first storage electrode 133a and the second storage electrode 133b, which are adjacent to each other, in adjacent sets of storage electrodes 133a to 133d.

The gate lines 121 and the storage electrode lines 131 may be made of aluminum (Al), an Al alloy, silver (Ag), an Ag alloy, copper (Cu), a Cu alloy, molybdenum (Mo), a Mo alloy, chromium (Cr), titanium (Ti), or tantalum (Ta). The gate lines 121 and the storage electrode lines 131 may have a multi-layered structure including two conductive layers (not shown) having different physical properties from each other. For example, one conductive layer thereof may be made of metal having low resistivity, such as Al, Ag, Cu, or their alloys, so as to reduce signal delay or voltage drop. The other conductive layer may be made of metals having superior physical, chemical, and electrical contact characteristics with indium tin oxide (ITO) or indium zinc oxide (IZO), such as Mo, a Mo alloy, Cr, Ti, and Ta. Exemplary combinations of layers include a Cr lower layer and an Al (alloy) upper layer, and an Al (alloy) lower layer and a Mo (alloy) upper layer. Alternatively, the gate lines 121 and the storage electrode lines 131 may be made of various metals and conductive materials. Sides of the gate lines 121 and the storage electrode lines 131 may be slanted at an angle in the range of about 30° to about 80° with respect to the surface of the substrate 110.

A gate insulating layer 140, which may be made of silicon nitride ($SiN_x$), silicon oxide ($SiO_x$), or the like, is formed on the gate lines 121 and the storage electrode lines 131.

A plurality of semiconductor stripes 151, which may be made of hydrogenated amorphous silicon (a-Si) or polysilicon, are formed on the gate insulating layer 140. Each semiconductor stripe 151 extends vertically and includes a plurality of protrusions 154 extending toward the gate electrodes 124.

The semiconductor stripes 151 widen in the vicinity of the gate lines 121 and the storage electrode lines 131 to cover the gate lines 121 and the storage electrode lines 131.

A plurality of ohmic contact stripes (not shown) and ohmic contact islands 165 are formed on the semiconductor stripes 151. The ohmic contact islands 165 may be made of silicide or a material such as $n^+$ hydrogenated a-Si doped with a high concentration of n-type impurities such as phosphorous. Each ohmic contact stripe includes a plurality of protrusions 163. The protrusions 163 and the ohmic contact islands 165, which form pairs, are disposed on the protrusions 154.

Sides of the semiconductor stripes 151 and the ohmic contacts 163 and 165 may also slant at an angle in the range of about 30° to about 80° with respect to the surface of the substrate 110.

A plurality of data lines 171, a plurality of drain electrodes 175, and a plurality of isolated metal pieces 178 are formed on the ohmic contacts 163 and 165 and the gate insulating layer 140.

The data lines 171 deliver data signals and extend mainly in the vertical direction to cross the gate lines 121. Each data line 171 also crosses the stem lines of the storage electrode lines 131 at the connections 133e. Each data line 171 includes a plurality of source electrodes 173, which extend toward the gate electrodes 124, and a large-area end portion 179, which may be connected to another layer or an external driving circuit. A data driving circuit (not shown) that generates data signals may be mounted on a flexible printed circuit film (not shown) attached on the substrate 110, directly mounted on the substrate 110, or integrated on the substrate 110. When the data driving circuit is integrated on the substrate 110, the data lines 171 may be directly connected to the data driving circuit.

The drain electrode 175 is spaced apart from the data line 171 and faces a source electrode 173 with the gate electrode 124 interposed therebetween. Each drain electrode 175 has a large-area end portion and a bar-shaped end portion. The bar-shaped end portion curves toward the source electrode 173 and is partially surrounded by the source electrode 173, which protrudes in a C-shape.

A gate electrode 124, a source electrode 173, and a drain electrode 175 constitute one thin film transistor (TFT) together with the protrusion 154 of the semiconductor stripes 151. The TFT's channel is formed in the protrusion 154 between the source electrode 173 and the drain electrode 175.

The metal pieces 178 are disposed on the gate lines 121 in the vicinity of the free end portions of the storage electrodes 133a.

The data lines 171, the drain electrodes 175, and the metal pieces 178 may be made of a refractory metal such as Mo, Cr, Ta, and Ti, or alloys thereof, and they may have a multi-layered structure (not shown) including a refractory metal layer and a conductive layer having low resistance. Examples of the multi-layered structure include a double-layered film including a Cr (alloy) or Mo (alloy) lower layer and an Al (alloy) upper layer, and a triple-layered film including a Mo (alloy) lower layer, an Al (alloy) intermediate layer, and a Mo (alloy) upper layer. Alternatively, the data lines 171, the drain electrodes 175, and the metal pieces 178 may be made of a variety of metals or conductive materials.

Sides of the data lines 171 and the drain electrodes 175 may also slant at an angle in the range of about 30° to about 80° with respect to the surface of the substrate 1110.

The ohmic contacts 163 and 165, which decrease contact resistance, are arranged only between the semiconductor stripes 151 and the data lines 171 and drain electrodes 175. The semiconductor stripes 151 are narrower than the data lines 171 at most places, but as described above, the semiconductor stripes 151 widen where they cross the gate lines 121 so as to provide a smooth surface profile, thereby preventing a short circuit of the data lines 171.

A passivation layer 180 is formed on the data lines 171, the drain electrodes 175, the metal pieces 178, and the exposed portions of the semiconductor stripes 151. The passivation layer 180 may be made of an inorganic insulator or organic insulator. The surface of the passivation layer 180 may be flat. Silicon nitride and silicon oxide may be used as the inorganic insulator. The organic insulator may have photosensitivity, and its dielectric constant may be 4.0 or less. Alternatively, the passivation layer 180 may have a double-layered structure of a lower inorganic layer and an upper organic layer in order to use the superior insulating characteristics of an organic layer and protect the exposed portions of the semiconductor stripes 151.

A plurality of contact holes 182 and 185, which expose data line end portions 179 and the drain electrodes 175, respectively, are formed in the passivation layer 180. A plurality of contact holes 181, which expose gate line end portions 129, a plurality of contact holes 183a, which expose portions of the storage electrode lines 131 at regions near the fixed ends of the first storage electrodes 133a, and a plurality of contact holes 183b, which expose the protrusions of the free ends of the first storage electrodes 133a, are formed in the passivation layer 180 and the gate insulating layer 140.

A plurality of pixel electrodes 191, a plurality of overpasses 83, and a plurality of contact assistants 81 and 82 are formed on the passivation layer 180. These components may be made of transparent conductive materials such as ITO and IZO or reflective metals such as Al and an Ag alloy.

The pixel electrodes 191 are connected to the drain electrodes 175 through the contact holes 185 and are supplied with data voltages from the drain electrodes 175. The pixel electrodes 191, which are supplied with the data voltage, generate an electric field together with the common electrode 270 of the common electrode panel 200, which is supplied with the common voltage, thereby determining the direction of the liquid crystal molecules 31 interposed between the two electrodes 191 and 270. Polarization of the light passing through the liquid crystal layer 3 changes according to the determined direction of the liquid crystal molecules 31. The pixel electrodes 191 and the common electrode 270 constitute capacitors ("liquid crystal capacitors") and hold the supplied voltage after the TFTs turn off.

The pixel electrodes 191 overlap the storage electrodes 133a, 133b, 133c, and 133d and the storage electrode lines 131. The left and right sides of the pixel electrodes 191 may be arranged closer to the data lines 171 than to the storage electrodes 133a and 133b. The pixel electrodes 191 and the drain electrodes 175 electrically connected thereto overlap with the storage electrode lines 131 to form storage capacitors. The storage capacitors supplement a voltage holding ability of the liquid crystal capacitors.

The pixel electrode 191 has a shape of an approximate quadrangle with four chamfered corners that have an angle of about 45° with respect to the gate lines 121.

Each pixel electrode includes lower cutouts 91a and 92a, upper cutouts 91b and 92b, and a center cutout 93. Therefore, the cutouts 91a, 91b, 92a, 92b, and 93 divide the pixel electrodes 191 into a plurality of partitions. The cutouts 91a, 91b, and 92a, 92b have approximate inversion symmetry with respect to a virtual transverse center line bisecting the pixel electrode 191. The lower and upper cutouts 91a, 91b, 92a, and 92b may extend substantially in slanted directions from the upper or lower side of the pixel electrode 191 to the left side of the pixel electrode 191 or from the right side of the pixel electrode 191 to the virtual transverse center line bisecting the pixel electrode 191. The lower cutout 92a overlaps with the fourth storage electrode 133d, and the upper cutout 92b overlaps with the third storage electrode 133c.

The lower and upper cutouts 91a, 91b, 92a, and 92b are disposed in lower and upper halves of the pixel electrode 191, respectively, with respect to the pixel electrode's transverse center line. The lower and upper cutouts 92a and 92b extend substantially perpendicular to each other with slope angles of about 45° with respect to the gate lines 121.

The center cutout 93 extends along the transverse center line of the pixel electrode 191 and has an inlet at the left side of the pixel electrode 191.

The number of cutouts may vary according to design factors such as the size of the pixel electrode 191, a ratio of lengths of the transverse and longitudinal sides of the pixel electrode 191, and types or characteristics of the liquid crystal layer 3.

The contact assistants 81 and 82 are connected to the gate line end portions 129 and the data line end portions 179 through the contact holes 181 and 182, respectively. The contact assistants 81 and 82 may enhance adhesion between the end portions 129 and 179 and external apparatuses, as well as protect these end portions.

The overpasses 83 are disposed across the gate lines 121 and connected to the exposed end portions of the free ends of the first storage electrodes 133a and the exposed portions of the storage electrode lines 131 through the contact holes 183b and 183a, which are located on opposite sides of the gate lines 121, respectively. The overpasses 83 may overlap with, and be connected to, the metal pieces 178. The storage electrode lines 131 may be used together with the overpasses 83 and the metal pieces 178 to repair defects of the gate lines 121, the data lines 171, or the TFTs. When repairing the gate lines 121, the storage electrode lines 131 may be connected to the gate lines 121 by irradiating a laser beam at crossing points between the gate lines 121 and the overpasses 83 to connect the gate lines 121 to the overpasses 83. Here, the metal pieces 178 may reinforce the connection between the gate lines 121 and the overpasses 83.

Next, the common electrode panel 200 will be described below with reference to FIG. 1, FIG. 3, FIG. 4, and FIG. 5.

A light blocking member 220, often referred to as a black matrix, is formed on an insulating panel 210, which may be made of transparent glass or the like. The light blocking member 220 includes linear portions extending along the data lines 171 and portions opposed to the TFTs. Additionally, the light blocking member 220 has a plurality of openings 225 that are opposed to, and have substantially the same shape as, the pixel electrodes 191. The light blocking member 220 may be formed as a single-layered film of Cr, a double-layered film of Cr and Cr oxide, or an organic layer including black pigment.

A plurality of color filters 230 are formed on the insulating panel 210 predominantly in a region defined by the light blocking member 220. The color filters 230 may extend in the vertical direction along the pixel electrodes 191. Each color filter 230 can display one of three primary colors, and examples of the three primary colors include red, green, and blue. Edges of neighboring color filters 230 may overlap with each other.

An overcoat 250, which may prevent the color filters 230 from being exposed and provide a flat plane, may be formed on the color filters 230.

The common electrode 270 may be made of a transparent conductive material such as ITO or IZO, and it is formed on the overcoat 250.

A plurality of sets of cutouts 71, 72a, 72b, and 73 are formed on the common electrode 270.

One set of cutouts faces one pixel electrode 191 and includes a center cutout 71, a lower cutout 72a, an upper cutout 72b, and a corner cutout 73. The cutouts 71, 72a, and 72b are disposed between the adjacent cutouts 91a, 91b, 92a, and 92b of the pixel electrode 191. Additionally, the upper and lower cutouts 72a and 72b extend substantially in parallel with the lower and upper cutouts 92a and 92b, respectively, of the pixel electrode 191.

The center cutout 71 includes a central transverse portion and an enlarged portion. The central transverse portion extends substantially along the transverse center line of the pixel electrode 191, and the enlarged portion widens in a direction from the end of the central transverse portion to the right edge of the pixel electrode 191.

The corner cutout 73 corresponds to the lower left corner of the pixel electrode 191, and it has a triangular shape having an oblique side that is substantially parallel with the cutout 92a of the pixel electrode 191.

The number and directions of the cutouts 71, 72a, 72b, and 73 may vary according to design factors, and the light-blocking member 220 overlaps the cutouts 71, 72a, 72b, and 73 to prevent light leakage in the vicinity of the cutouts 71, 72a, 72b, and 73.

A column spacer 320 is formed on the overcoat 250 at a position corresponding to the corner cutout 73. The column spacer 320 decreases in width in the direction from the upper panel 200 to the lower panel 100.

Alignment layers 11 and 21 are arranged on inner surfaces of the display panels 100 and 200, respectively. The alignment layers 11 and 21 may be vertical alignment layers. Polarizers 12 and 22 are disposed on outer surfaces of the display panels 100 and 200, respectively. The transmission axes of the polarizers are perpendicular to each other, and one of the transmission axes is preferably parallel to the gate lines 121. With a reflective LCD, one of the two polarizers 12 and 22 may be omitted.

The LCD may include a backlight unit (not shown) for supplying light to the polarizers 12 and 22, the panels 100 and 200, and the liquid crystal layer 3.

The liquid crystal layer 3 has a negative anisotropy, and the liquid crystal molecules of the liquid crystal layer 3 are aligned so as for major axes thereof to be perpendicular to the surfaces of the panels 100 and 200 without application of an electric field to the liquid crystal molecules. Therefore, incident light cannot pass through the crossed polarizers 12 and 22.

Applying the common voltage and the data voltage to the common electrode 270 and the pixel electrodes 191, respectively, generates an electric field in a direction substantially perpendicular to the surfaces of the panels 100 and 200. In response to the electric field, the major axis direction of the liquid crystal molecules changes to be perpendicular to the direction of the electric field. Hereinafter, the pixel electrodes 191 and the common electrode 270 are collectively referred to as field generating electrodes.

The cutouts 71, 72a, 72b, 73, 91a, 91b, 92a, and 92b of the field generating electrodes 270 and 191, and the oblique sides of the pixel electrodes 191 that are parallel with the cutouts, distort the electric field to generate a horizontal component of the electric field for determining the tilted orientation of the liquid crystal molecules. The horizontal component of the electric field is perpendicular to the oblique sides of the cutouts 71, 72a, 72b, 73, 91a, 91b, 92a, and 92b and the oblique sides of the pixel electrodes 191. One set of cutouts 71, 72a, 72b, 91a, 91b, 92a, and 92b divides one pixel electrode 191 into a plurality of sub-areas having two slanted primary edges. Because the tilted orientations of the liquid crystal molecules in the sub-areas are determined by the horizontal component of the electric field, the tilted orientations include about four directions. Similarly, since the liquid crystal molecules can be adjusted to have various tilt angles, it is possible to increase an LCD's reference viewing angle.

The liquid crystal molecules 31 in the vicinity of the column spacer 320 are slanted to be perpendicular to the surface of the column spacer 320. When the corner cutout 73 is formed according to an exemplary embodiment of the present invention, the slope direction of the liquid crystal molecules caused by the column spacer 320 is the same as that of the liquid crystal molecules caused by the electric field generated between the oblique side of the cutout 73 and the oblique side of the pixel electrode 191.

Accordingly, since the slope direction of the liquid crystal molecules 31 caused by the column spacer 320 is different from that of the liquid crystal molecules 31 caused by the electric field formed between the pixel electrode 191 and the cutout of the common electrode 270, the liquid crystal molecules may not collide with each other, thereby reducing texture.

As described above and shown in FIG. 1, a distance between a center axis of the column spacer 320 and an oblique side (oblique side formed by chamfering the corner) of the pixel electrode 191 should be less than a distance between the center axis of the column spacer 320 and the oblique side of the corner cutout 73 that is parallel with the oblique side of the pixel electrode 191 and the cutout 92a, so that the alignment direction of the liquid crystal molecule 31 in the vicinity of the column spacer 320 may be the same as the alignment direction of the liquid crystal molecule 31 caused by the electric field generated by the field generating electrodes 191 and 270.

As described in exemplary embodiments of the present invention, when the corner cutout is formed, the alignment direction of the liquid crystal molecules caused by the column spacer is the same as the direction of a domain of the LCD, and the liquid crystal molecules may not collide with each other, thereby reducing texture.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display, comprising:
   a first substrate;
   a first field generating electrode arranged on the first substrate, the first field generating electrode comprising a first cutout and a second cutout;
   a second substrate facing the first substrate;
   a thin film transistor arranged on the second substrate;

a second field generating electrode arranged on the second substrate and connected to the thin film transistor, the second field generating electrode comprising a third cutout;

a liquid crystal layer interposed between the first field generating electrode and the second field generating electrode; and a column spacer arranged between the first substrate and the second substrate, the column spacer being arranged in a region substantially corresponding to the first cutout.

2. The liquid crystal display of claim 1, wherein the second field generating electrode comprises a first oblique side, and the first cutout comprises a second oblique side that is parallel with the first oblique side, and wherein a distance between a center axis of the column spacer and the first oblique side is less than a distance between the center axis of the column spacer and the second oblique side.

3. The liquid crystal display of claim 2, wherein the column spacer decreases in width in a direction from the first substrate to the second substrate.

4. The liquid crystal display of claim 2, wherein the first oblique side and the second oblique side are slanted at an angle of about 45° with respect to a gate line.

5. The liquid crystal display of claim 1, wherein the second cutout and the third cutout are alternately disposed.

6. The liquid crystal display of claim 1, further comprising a color filter arranged on the first substrate.

7. The liquid crystal display of claim 1, wherein the first cutout is triangular shaped.

8. The liquid crystal display of claim 2, wherein the first cutout is triangular shaped.

9. The liquid crystal display of claim 1, wherein the column spacer is arranged entirely within the region corresponding to the first cutout.

10. A liquid crystal display, comprising:

a first substrate;

a first field generating electrode arranged on the first substrate, the first field generating electrode comprising a first cutout and a second cutout;

a second substrate facing the first substrate;

a second field generating electrode arranged on the second substrate, the second field generating electrode comprising a third cutout;

a storage electrode arranged on the second substrate, the storage electrode overlapping with the second field generating electrode to form a storage capacitor;

a liquid crystal layer interposed between the first field generating electrode and the second field generating electrode; and a column spacer arranged between the first substrate and the second substrate, the column spacer being arranged in a region substantially corresponding to the first cutout.

11. The liquid crystal display of claim 10, wherein the second field generating electrode comprises a first oblique side, and the first cutout comprises a second oblique side that is parallel with the first oblique side, and wherein a distance between a center axis of the column spacer and the first oblique side is less than a distance between the center axis of the column spacer and the second oblique side.

12. The liquid crystal display of claim 11, wherein the column spacer decreases in width in a direction from the first substrate to the second substrate.

13. The liquid crystal display of claim 11, wherein the first oblique side and the second oblique side are slanted at an angle of about 45° with respect to a gate line.

14. The liquid crystal display of claim 10, wherein the second cutout and the third cutout are alternately disposed.

15. The liquid crystal display of claim 10, further comprising a color filter arranged on the first substrate.

16. The liquid crystal display of claim 10, further comprising a thin film transistor arranged on the second substrate, wherein the thin film transistor is connected to the second field generating electrode.

17. The liquid crystal display of claim 10, wherein the first cutout is triangular shaped.

18. The liquid crystal display of claim 11, wherein the first cutout is triangular shaped.

19. The liquid crystal display of claim 10, wherein the column spacer is arranged entirely within the region corresponding to the first cutout.

* * * * *